(12) United States Patent
Suzuki (10) Patent No.: US 9,651,320 B2
(45) Date of Patent: May 16, 2017

(54) ICT EQUIPMENT

(71) Applicant: Kumiko Suzuki, Tokyo (JP)

(72) Inventor: Kumiko Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 817 days.

(21) Appl. No.: 13/782,490

(22) Filed: Mar. 1, 2013

(65) Prior Publication Data

US 2013/0228325 A1 Sep. 5, 2013

(30) Foreign Application Priority Data

Mar. 2, 2012 (JP) .................. 2012-046673

(51) Int. Cl.
*F28F 27/00* (2006.01)
*G06F 1/20* (2006.01)

(52) U.S. Cl.
CPC .............. *F28F 27/00* (2013.01); *G06F 1/206* (2013.01)

(58) Field of Classification Search
None
See application file for complete search history.

(56) References Cited

FOREIGN PATENT DOCUMENTS

| JP | 5-100063 A | 4/1993 |
| JP | 2006-252608 A | 9/2006 |
| JP | 2011151131 A | 8/2011 |

OTHER PUBLICATIONS

Machine translation of JP 05-100063 (published Apr. 23, 1993).*
Machine translation of JP 2006-252608.*
Japanese Office Action for JP2012-046673 mailed on Apr. 2, 2013.

* cited by examiner

*Primary Examiner* — Ryan Jarrett (57) ABSTRACT

The temperature sensor detects a component temperature of an electronic component included in the ICT equipment. The declination index value calculation means calculates a declination index value indicating the degree of declination of the component temperature of the electronic component, based on the detection result of the temperature sensor. As a declination index value, a declination quantity of the component temperature per unit time or a difference between the highest value of the component temperature in a past certain period and the current component temperature may be used, for example. The control means controls the number of rotations of the cooling fan in accordance with the declination index value calculated by the declination index value calculation means. More specifically, the control means causes the number of rotations of the fan to be lower as the degree of declination of the component temperature indicated by the declination index value is larger.

8 Claims, 10 Drawing Sheets

|  | #1 | #2 | #3 | ... | #60 |
|---|---|---|---|---|---|
| TEMPERATURE SENSOR 22 | TA1 | TA2 | TA3 | ... | TA60 |
| TEMPERATURE SENSOR 23 | TB1 | TB2 | TB3 | ... | TB60 |
| TEMPERATURE SENSOR 24 | TC1 | TC3 | TC3 | ... | TC60 |

185 DETECTION RESULT STORING SECTION

ICT EQUIPMENT

INCORPORATION BY REFERENCE

This application is based upon and claims the benefit of priority from Japanese patent application No. 2012-046673, filed on Mar. 2, 2012, the disclosure of which is incorporated herein in its entirety by reference.

TECHNICAL FIELD

The present invention relates to ICT (Information and Communication Technology) equipment such as a server device having a cooling fan, a control device thereof, a temperature controlling method thereof, and a program.

BACKGROUND ART

Conventionally, ICT equipment such as a server device is installed in a machine room equipped with air conditioning, and is operated in an environment of an almost constant temperature in most cases. However, in order to reduce investment cost and operating cost of a machine room, attention is focused on a machine room where outside air is taken in, which is used to cool the inside of ICT equipment. A room temperature of a machine room utilizing outside air varies widely, compared with that of a machine room equipped with air conditioning. As such, it is desired that ICT equipment also has a function of controlling the internal temperature by itself.

As ICT equipment having a function of controlling the internal temperature, one disclosed in JP 2011-151131 A (Patent Document 1) has been known, for example. The server device (ICT equipment) disclosed in Patent Document 1 includes a cooling fan, an intake air temperature sensor which detects a temperature of intake air, a component temperature sensor which detects a temperature of an electronic component arranged inside the device, and a controller which controls the number of rotations of the cooling fan. The controller controls the number of rotations of the fan based on the detection result of the intake air temperature sensor and the detection result of the component temperature sensor. More specifically, the controller controls the number of rotations of the cooling fan in such a manner that the number of rotations of the cooling fan becomes higher as the intake air temperature is higher based on the detection result of the intake air temperature sensor, until the detection results of all component temperature sensors become a first threshold or smaller. When the detection results of all component temperature sensors become the first threshold or smaller, the controller controls the number of rotations of the cooling fan in such a manner that the number of rotations of the cooling fan becomes higher as the detection results of the component temperature sensors are higher based on the detection results of the component temperature sensors, until the detection results of all component temperature sensors become a second threshold (first threshold<second threshold).

Patent Document 1: JP 2011-151131 A

According to the technology disclosed in Patent Document 1, the internal temperature of ICT equipment can be controlled without depending on air conditioning. However, with the technology disclosed in Patent Document 1, there is a possibility that damage or malfunction of electronic components is caused if the intake air temperature drops sharply. As such, with the technology disclosed in Patent Document 1, if the intake air temperature drops sharply, there is a possibility that condensation occurs on the inner wall of the casing of the hard disk drive, which may induce rust so that damage or malfunction of the hard disk drive may be caused. In general, as a casing of a hard disk drive has air tightness of some extent, even if the intake air temperature drops sharply, the internal temperature of the casing of the hard disk drive will not drop sharply. As such, a large temperature difference is caused between the internal temperature of the casing of the hard disk drive and the inner wall temperature of the casing, which may cause condensation. It should be noted that if the temperature changes sharply, there is also a possibility that rust is generated due to condensation on other electronic components so that damage or malfunction of the electronic components may occur.

SUMMARY

In view of the above, an exemplary object of the present invention is to provide ICT equipment capable of solving a problem that damage or malfunction may occur in electronic components when an intake air temperature drops sharply.

According to an exemplary aspect of the present invention, ICT equipment of the present invention includes a cooling fan;

a temperature sensor that detects a component temperature of an electronic component included in the ICT equipment;

a declination index value calculation means (unit) for calculating an index value indicating the degree of declination of the component temperature of the electronic component based on a detection result of the temperature sensor; and a control means (unit) for controlling the number of rotations of the cooling fan in accordance with the index value calculated by the declination index value calculation means.

According to another exemplary aspect of the present invention, a control device of the present invention includes a declination index value calculation means for calculating an index value indicating the degree of declination of a component temperature of an electronic component included in ICT equipment, based on a detection result of a temperature sensor that detects the component temperature of the electronic component, and a control means for controlling the number of rotations of a cooling fan in accordance with the index value calculated by the declination index value calculation means.

According to another exemplary aspect of the present invention, a temperature controlling method of the present invention includes by a declination index value calculation means, calculating an index value indicating the degree of declination of a component temperature of an electronic component included in ICT equipment, based on a detection result of a temperature sensor that detects the component temperature of the electronic component, and by a control means, controlling the number of rotations of a cooling fan in accordance with the index value calculated by the declination index value calculation means.

According to another exemplary aspect of the present invention, a program of the present invention causes a computer to function as a declination index value calculation means for calculating an index value indicating the degree of declination of a component temperature of an electronic component included in ICT equipment, based on a detection result of a temperature sensor that detects the component temperature of the electronic component, and a control means for controlling the number of rotations of a cooling fan in accordance with the index value calculated by the declination index value calculation means.

According to the present invention, it is possible to achieve an advantageous effect that damage or malfunction of electronic components can be prevented even if an intake air temperature drops sharply.

EXEMPLARY EMBODIMENTS

Next, exemplary embodiments of the present invention will be described in detail with reference to the drawings.

First Exemplary Embodiment

Figure 1:
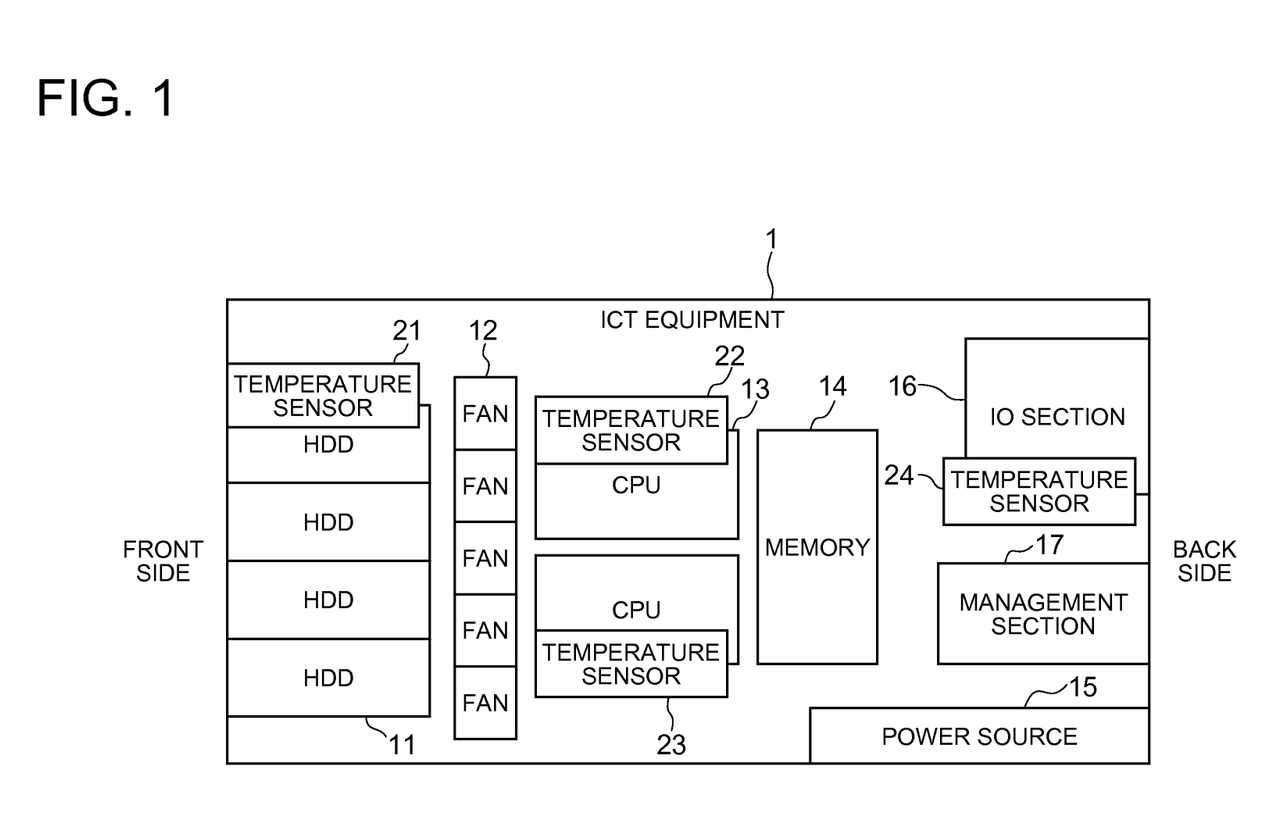
FIG. 1 is a block diagram showing an exemplary configuration of ICT equipment 1 according to a first exemplary embodiment of the present invention.

Referring to FIG. 1, ICT equipment 1 according to a first exemplary embodiment of the present invention is configured such that a plurality of hard disk drives (HDD) 11 and a temperature sensor 21, which detects intake air temperature, are arranged on the front side of the casing, and a plurality of cooling fans 12 are arranged behind them. Behind the cooling fans 12, a plurality of CPUs 13 having high heating values, and temperature sensors 22 and 23 which detect component temperatures of the CPUs 13, are arranged. Behind them, a memory 14, a power source 15, an input/output section (I/O section) 16 for network cards or the like, a management section 17 which is realized by a BMC (Base Management Controller) and functions as a controller, and a temperature sensor 24 which detects the component temperature of the I/O section 16, are arranged.

Figure 2:
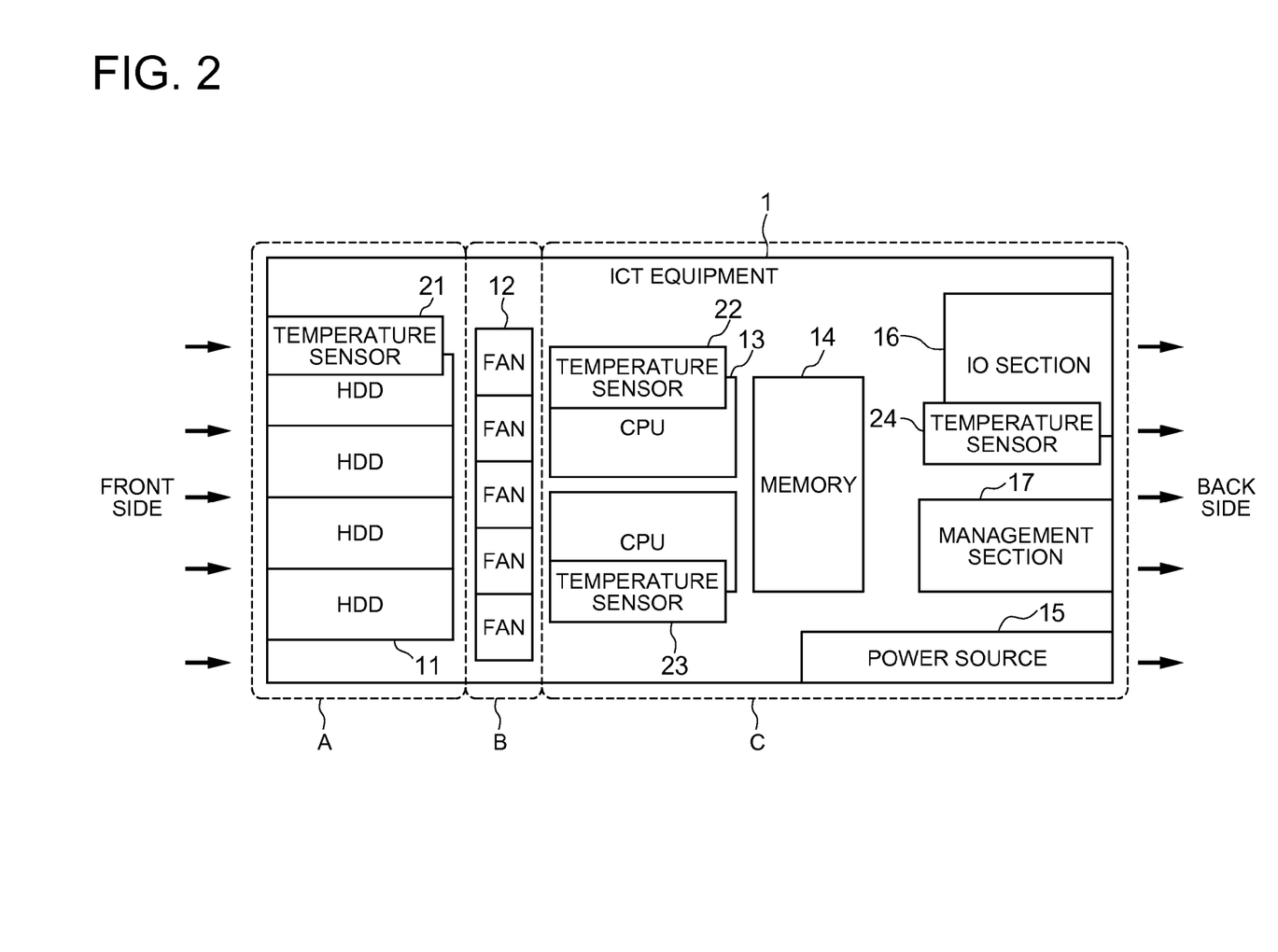
FIG. 2 is a diagram showing the airflow in the ICT equipment 1.

The management section 17 has a function of controlling the number of rotations of the cooling fans 12, based on the detection results of the temperature sensors 21 to 24. By rotating the cooling fans 12, outside air is taken from the air intake surface (not shown) provided on the front side of the casing, and the air is discharged from the discharge surface (not shown) provided on the rear side of the casing, through a hard disk drives layout area A→ a cooling fans layout area B→ a heating components layout area C, as shown in FIG. 2.

Figure 3:
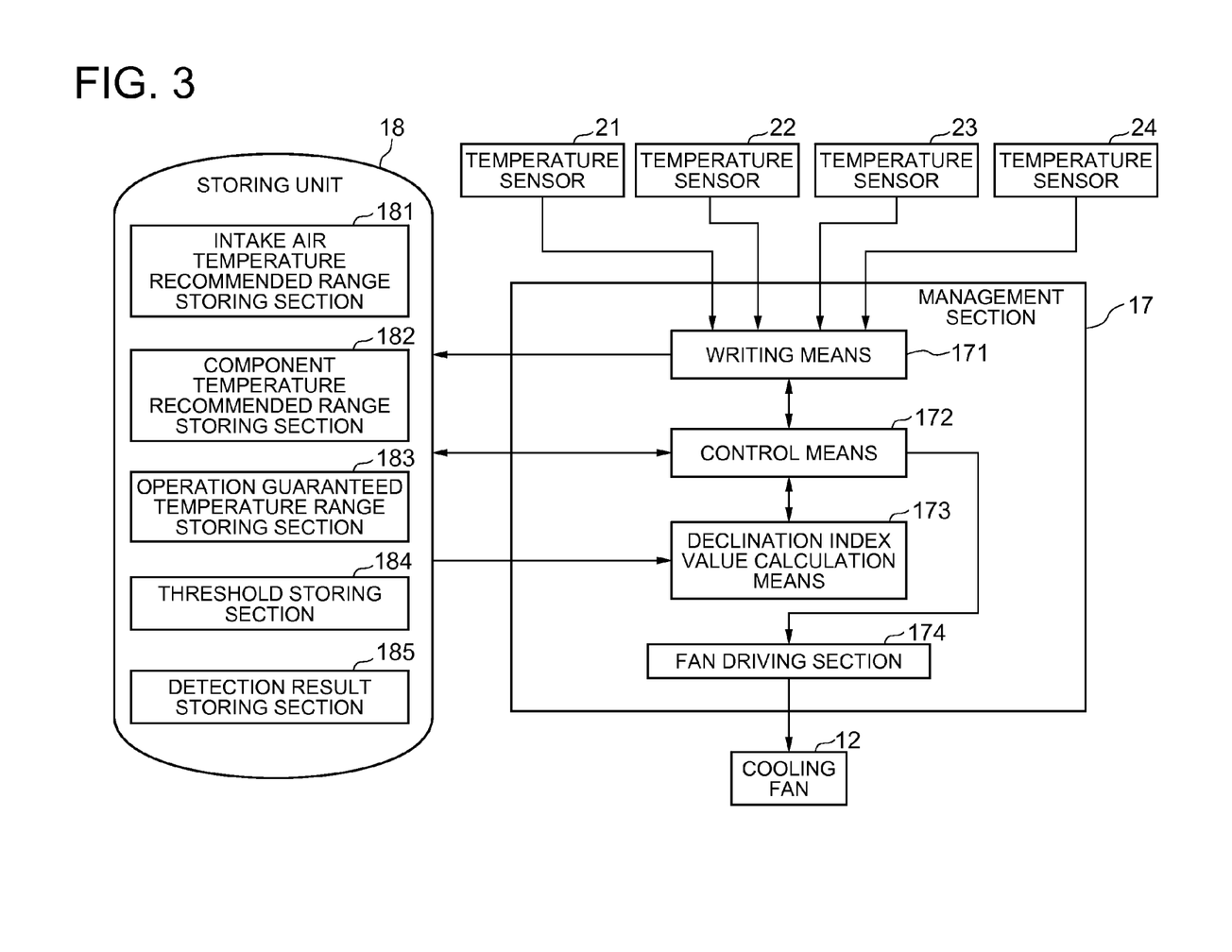
FIG. 3 is a block diagram showing an exemplary configuration of a management section 17.

Referring to FIG. 3, the management section 17 includes a writing means (unit) 171, a control means (unit) 172, a declination index value calculation means (unit) 173, a fan driving section 174, and a storing unit 18 such as a disk unit.

The storing unit 18 includes an intake air temperature recommended range storing section 181, a component temperature recommended range storing section 182, an operation guaranteed temperature range storing section 183, a threshold storing section 184, and a detection result storing section 185.

In the intake air temperature recommended range storing section 181, a range of intake air temperature in which the ICT equipment 1 can operate stably (intake air temperature recommended range) is stored. When the intake air temperature is out of the intake are temperature recommended range, the failure rate of the operating components becomes worse.

In the component temperature recommended range storing section 182, a range of component temperature in which the ICT equipment 1 can operate stably (component temperature recommended range) is stored. In general, a component temperature becomes higher than the intake air temperature because electronic components (such as a CPU) constituting the ICT equipment 1 are heating elements. When the component temperature becomes out of the component temperature recommended range, the failure rate of the electronic components becomes worse.

In the operation guaranteed temperature range storing section 183, a temperature range in which the ICT equipment 1 is operable (operation guaranteed temperature range) is stored.

Figure 4:
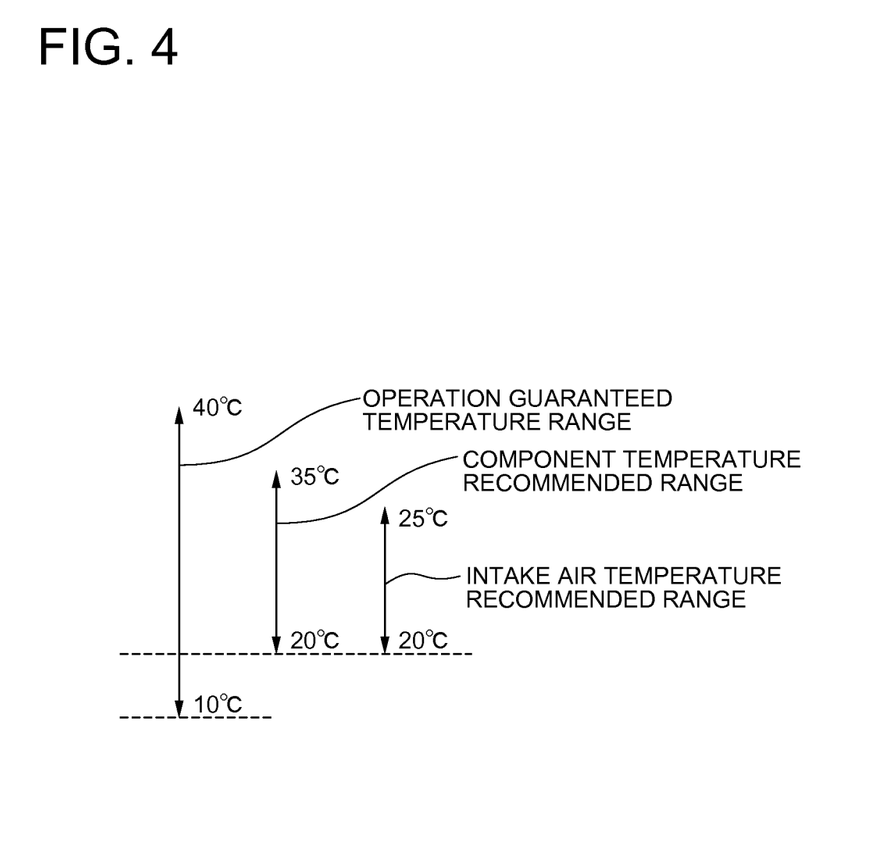
FIG. 4 is an illustration showing the relationship between an intake air temperature recommended range, a component temperature recommended range, and an operation guaranteed temperature range.

FIG. 4 shows examples of an intake air temperature recommended range, a component temperature recommended range, and an operation guaranteed temperature range. As shown in FIG. 4, the lower limit value of the operation guaranteed temperature range is lower than the lower limit values of the intake air temperature recommended range and the component temperature recommended range, and the upper limit value of the operation guaranteed temperature range is higher than the upper limit values of the intake air temperature recommended range and the component temperature recommended range. It should be noted that the values shown in FIG. 4 are just examples, and the temperature relationship may be different depending on ICT equipment.

In the threshold storing section 184, a threshold Th with respect to an index value indicating the degree of declination (declination index value) of the component temperature of the ICT equipment 1 is stored. The threshold Th may be a value corresponding to the installation environment of the ICT equipment 1, which can be 5° C./hour, for example.

Figure 5:
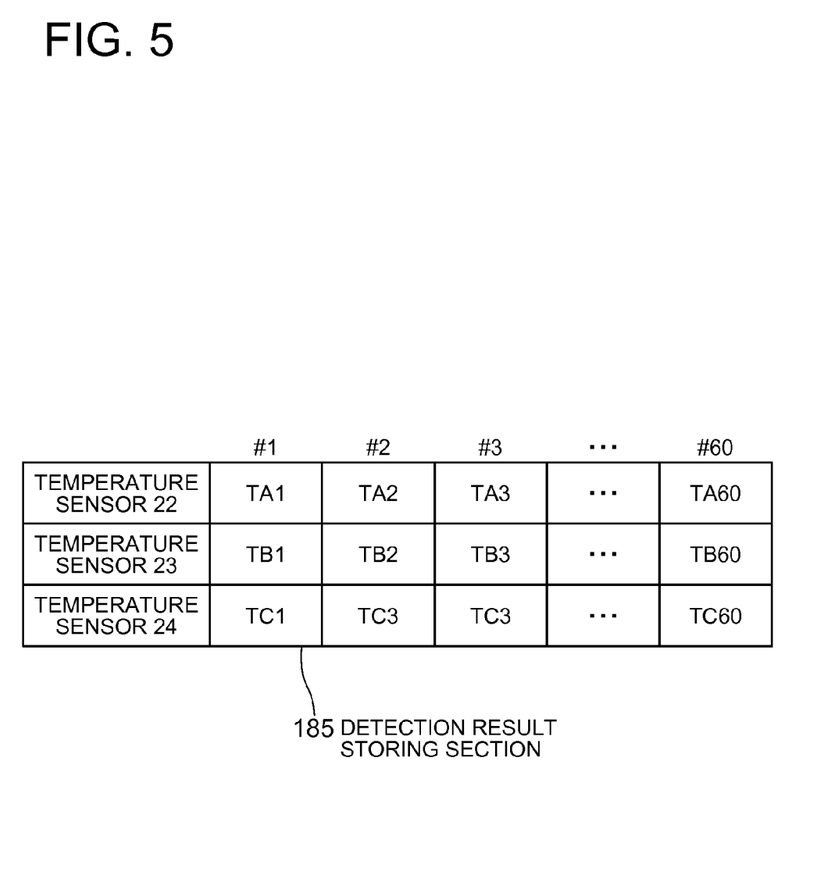
FIG. 5 is a table showing an exemplary configuration of a detection result storing section 185.

In the detection result storing section 185, detection results of the temperature sensors 21 to 24 for a past certain period of time (one hour in the present embodiment) are stored. Referring to FIG. 5, the detection result storing section 185 has 60 pieces of record regions #1 to #60 for each of the temperature sensors 22 to 24.

The writing means 171 in the ICT equipment 1 has a function of writing component temperatures detected by the temperature sensors 22 to 24 into the detection result storing section 185, in accordance with writing instructions which are given periodically (every minute in the present embodiment) by the control means 172, and a function of providing the control means 172 with the intake air temperature detected by the temperature sensor 21 and the component temperatures detected by the temperature sensors 22 to 24. More specifically, the writing means 171 cyclically uses the record regions #1 to #60, assigned to each of the temperature sensors 22 to 24, to write component temperatures detected by the temperature sensors 22 to 24 to thereby store the component temperatures for the past one hour in the detection result storing section 185.

The declination index value calculation means 173 has a function of calculating, for each of the temperature sensors 22 to 24, a declination index value indicating the degree of declination of a component temperature detected by each temperature sensor, in accordance with a declination index value calculation instruction given by the control means 172. As a declination index value, the following values (1) to (3) may be used, for example.

(1) A quantity of declination of the component temperature of the ICT equipment 1 per unit time.

(2) An average value of the component temperature declination rates of the ICT equipment 1 in a plurality of measurement periods. The component temperature declination rate is a value calculated by dividing a difference Δt, between a component temperature t1 detected at a time when a measurement period starts and a component temperature t2 detected at a time when the measurement period ends, by the measurement period.

(3) A difference between the highest value of the component temperature of the ICT equipment 1 in a past certain period of time and the current component temperature.

The control means 172 has a function of outputting a writing instruction to the writing means 171, and a function of outputting a declination index value calculation instruction to the declination index value calculation means 173. The control means 172 also has a function of determining which of R1 (low speed), R2 (intermediate speed), and R3 (high speed) the number of rotations of the cooling fans 12 should be, based on the detection results of the temperature sensors 21 to 24 provided by the writing means 171, the stored contents in the respective storing sections 181 to 184, and the declination index value calculated by the declination index value calculation means 173, and a function of notifying the fan driving section 174 of the determined number of rotations. It should be noted that the number of rotations has a relationship of 0<R1<R2<R3.

The fan driving section 174 rotates the cooling fans 12 in the number of rotations notified by the control means 172.

It should be noted that the management section 17 can be realized by the CPU (central processing unit), and in that case, the management section 17 can be realized in the following manner. That is, a disk, a semiconductor memory, or another recording medium storing a program for causing the CPU to function as the writing means 171, the control means 172, and the declination index value calculation means 173 is prepared, and the CPU is caused to read the program. The CPU controls the own operation in accordance with the readout program to thereby realize the writing means 171, the control means 172, and the declination index value calculation means 173 on the own CPU.

Operation of First Exemplary Embodiment

Figure 6:
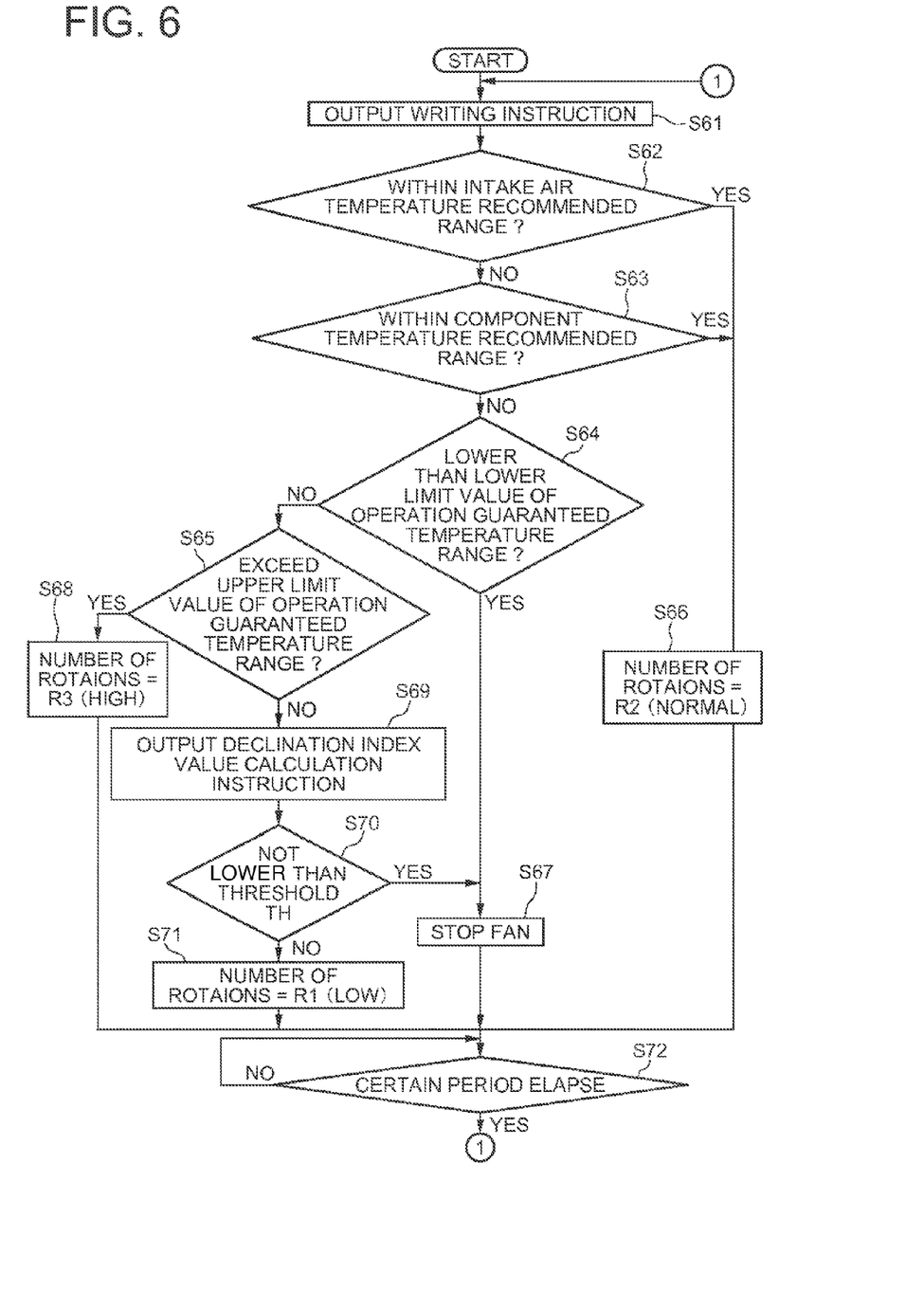
FIG. 6 is a flowchart showing exemplary processing of a control means 172 in the management section 17.

Next, operation of the present embodiment will be described with reference to the flowchart of FIG. 6.

When the ICT equipment 1 is activated, the control means 172 in the management section 17 outputs a writing instruction to the writing means 171 (step S61). Thereby, the writing means 171 writes each of component temperatures detected by the respective temperature sensors 22 to 24 into one of the record regions #1 to #60 (for example, in the record region #1) for the respective temperature sensors 22 to 24, provided in the detection result storing section 185, and provides the control means 172 with the detection results of the temperature sensors 21 to 24.

Upon reception of the detection results of the temperature sensors 21 to 24, the control means 172 first determines whether or not the intake air temperature detected by the temperature sensor 21 is within the intake air temperature recommended range stored in the intake air temperature recommended range storing section 181 (step S62). Then, if the temperature is within the intake air temperature recommended range (Yes at step S62), the control means 172 determines that the number of rotations of the cooling fans 12 to be "R2 (normal)", and notifies the fan driving section 174 of the determined number of rotations (step S66). Then, the control means 172 waits until a certain period (1 minute in the present embodiment) elapses (step S72), and then returns to the processing of step S61. In contrast, if the control means 172 determines that the intake air temperature is out of the intake air temperature recommended range (No at step S62), the control means 172 determines whether all of the component temperatures detected by the temperature sensors 22 to 24 are within the component temperature recommended range stored in the component temperature recommended range storing section 182 (step S63)

If all of the component temperatures detected by the temperature sensors 22 to 24 are within the component temperature recommended range (Yes at step S63), the control means 172 determines the number of rotations of the fan to be "R2", and notifies the fan driving section 174 of the determined number of rotations "R2" (step S66). In contrast, if even one of the component temperatures detected by the temperature sensors 22 to 24 is out of the component temperature recommended range (No at step S63), the control means 172 performs the processing of step S64.

At step S64, the control section 172 determines whether or not any of the component temperatures detected by the temperature sensors 22 to 24 is lower than the lower limit value of the operation guaranteed temperature range stored in the operation guaranteed temperature range storing section 183. If there is a component temperature lower than the lower limit value (Yes at step S64), the control means 172 instructs the fan driving section 174 to stop the cooling fans 12 (Step S67). Thereby, the cooling fans 12 are stopped, and the component temperatures increase due to the heating of the electronic components such as the CPUs 13 and the hard disk drives 11. In contrast, if all of the component temperatures detected by the temperature sensors 22 to 24 are not lower than the operation guaranteed temperature range (No at step S64), the control means 172 performs the processing of step S65.

At step S65, the control means 172 determines whether or not any of the component temperatures detected by the temperature sensors 22 to 24 exceeds the upper limit value of the operation guaranteed temperature range. If there is a component temperature exceeding the upper limit value (Yes at step S65), the control means 172 determines the number of rotations of the fans to be "R3 (high speed)", and provides the fan driving section 174 with the determined number of rotations of the fans "R3" (step S68). In contrast, if all of the component temperatures detected by the temperature sensors 22 to 24 do not exceed the upper limit value of the operation guaranteed temperature range (No at step S65), the control means 172 outputs a declination index value calculation instruction to the declination index value calculation means 173 (step S69).

Thereby, the declination index value calculation means 173 calculates a declination index value indicating the degree of declination of the component temperature, and returns the calculated declination index value to the control means 172.

Figure 7:
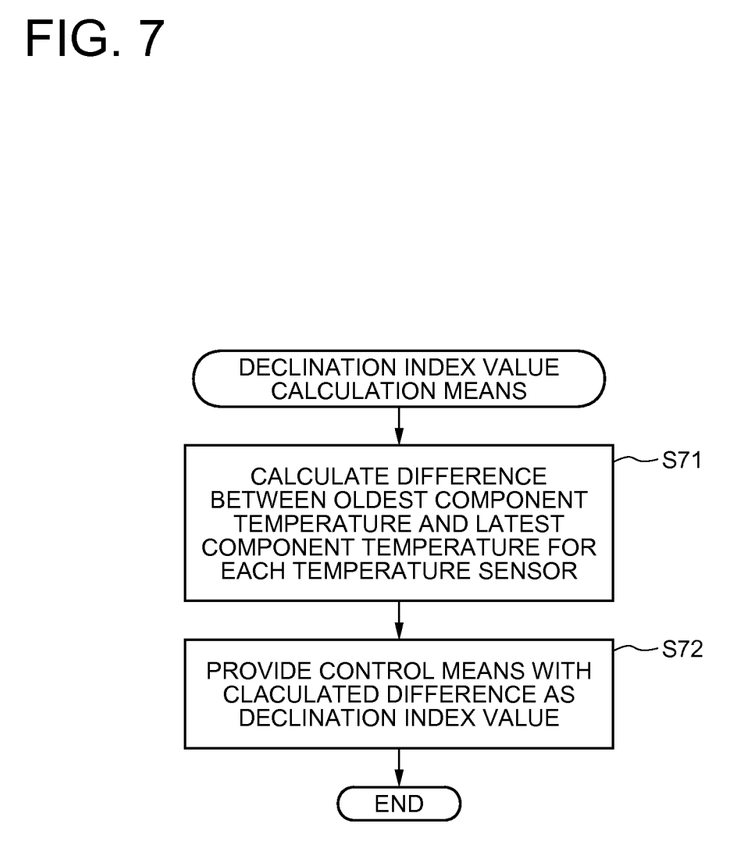
FIG. 7 is a flowchart showing an example of a method of calculating a declination index value.

Here, a method of calculating a declination index value will be described. When a declination index value calculation instruction is input from the control means 172, the declination index value calculation means 173 calculates, for each of the temperature sensors 22 to 24, a difference "To−Tn" between a component temperature To which is the oldest temperature stored in the detection result storing section 185 and a component temperature Tn which is the latest temperature stored in the detection result storing section 185, as shown in the flowchart of FIG. 7 (step S71). Then, the declination index value calculation means 173 returns the difference calculated for each of the temperature sensors 22 to 24 to the control means 172, as a declination index value calculated based on the detection result of each of the temperature sensors 22 to 24 (step S72). In the present embodiment, as the detection results of the temperature sensors 22 to 24 are recorded every minute by cyclically using the 60 pieces of record regions provided for each of the temperature sensors 22 to 24, the declination index value calculated as described above is a quantity of declination of the component temperature per unit time (per 1 hour).

Figure 8:
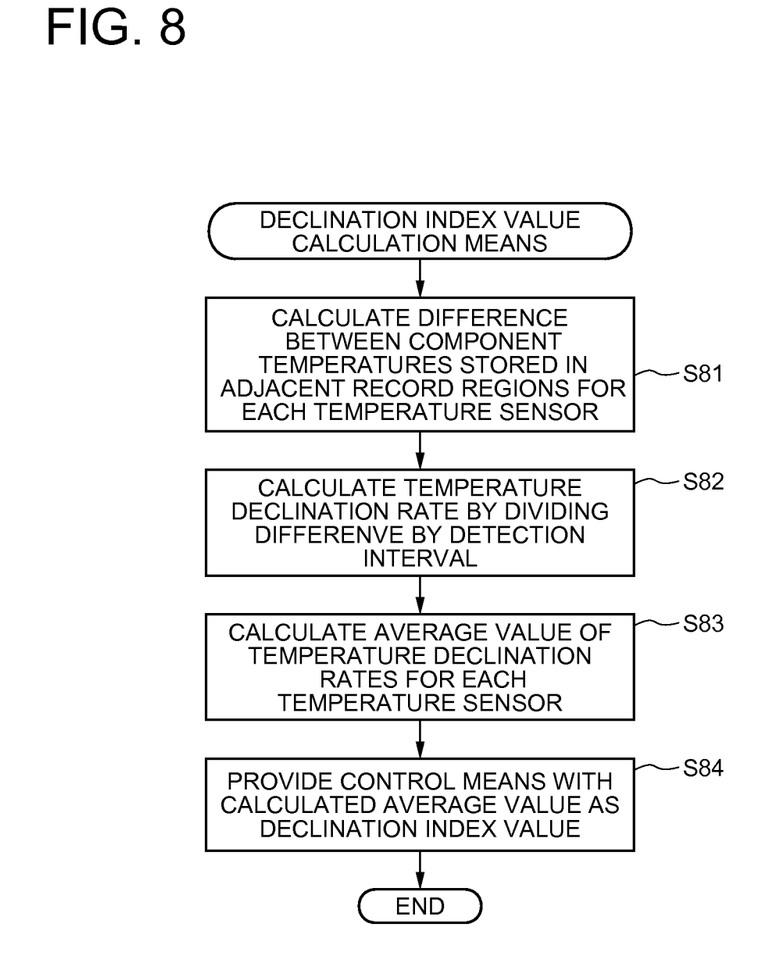
FIG. 8 is a flowchart showing another method of calculating a declination index value.

A method of calculating a declination index value is not limited to the one described above. It is also possible to adopt a method shown in the flowchart of FIG. 8. Referring to FIG. 8, when a declination index value calculation instruction is input, the declination index value calculation means 173 calculates, for each of the temperature sensors 22 to 24, a difference between component temperatures stored in adjacent record regions, to thereby obtain a difference between the oldest component temperature and the second oldest component temperature, a difference between the second oldest component temperature and the third oldest component temperature, . . . and a difference between the fifty-ninth oldest component temperature and the latest component temperature (step S81).

Next, the declination index value calculation means 173 divides the obtained difference by the detection interval (1 minute in the present embodiment) of the component temperature to calculate a temperature declination rate (step S82). Then, for each of the temperature sensors 22 to 24, the declination index value calculation means 173 obtains an average value of the calculated temperature declination rates (step S83), and returns the obtained average value to the control means 172 as a declination index value obtained from the detection result of each of the temperature sensors 22 to 24 (step S84).

Figure 9:
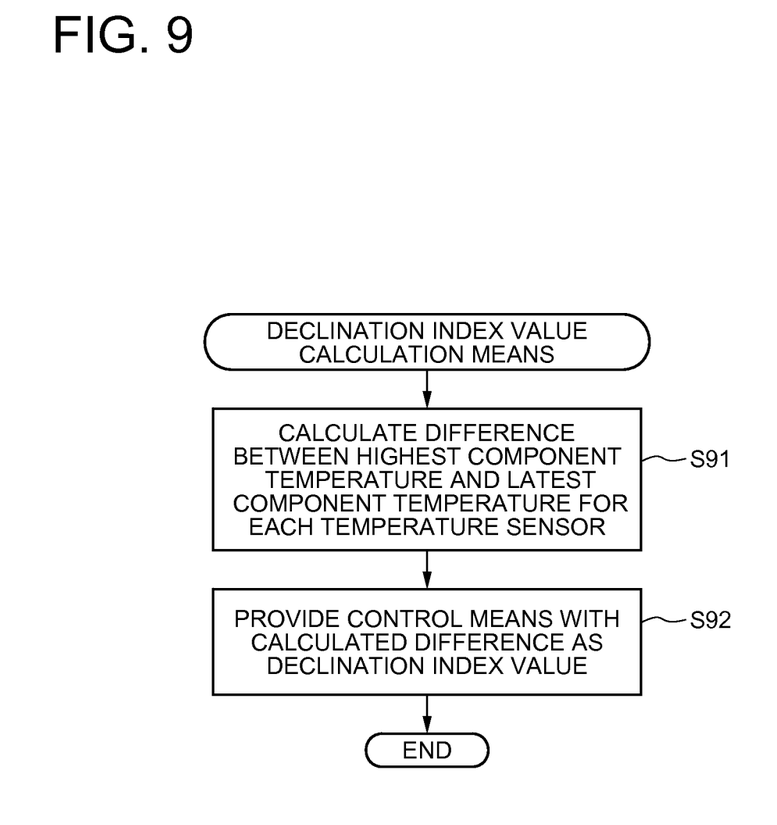
FIG. 9 is a flowchart showing still another method of calculating a declination index value.

Further, it is also possible to adopt a method of calculating a declination index value as shown in the flowchart of FIG. 9. Referring to FIG. 9, when a declination index value calculation instruction is input from the control means 172, the declination index value calculation means 173 calculates, for each of the temperature sensors 22 to 24, a difference between the highest component temperature and the latest component temperature (step S91). Then, the declination index value calculation means 173 returns the difference calculated for each of the temperature sensors 22 to 24 to the control means 172 as a declination index value calculated based on the detection result of each of the temperature sensors 22 to 24 (step S92).

It should be noted that a method of calculating a declination index value is not limited to those described above.

When the control means 172 receives declination index values of the respective temperature sensors 22 to 24 from the declination index value calculation means 173, the control means 172 compares them with the threshold Th stored in the threshold storing section 184 (step S70). Then, if at least one of the declination index values of the respective temperature sensors 22 to 24 is not lower than the threshold Th (Yes at step S70), the control section 172 determines that the component temperature is lowered sharply so that condensation may occur. As such, the control means 172 instructs the fan driving section 174 to stop rotation of the cooling fans 12 (step S67). Thereby, the cooling fans 12 are stopped, and a sharp drop in the temperatures of the electronic components such as the casings of the hard disk drives 11 can be prevented, so that occurrence of condensation on the inner walls of the casings can be prevented. In contrast, if the control means 172 determines that all of the declination index values of the temperature sensors 22 to 24 are lower than the threshold Th (No at step S70), the control means 172 instructs the fan driving section 174 to control the number of rotations of the fans to be "R1 (low speed)" (step S71), then waits until a certain period (1 minute) elapses, and returns to the processing of step S61.

It should be noted that while the present embodiment is configured such that the cooling fans 12 are stopped if at least one of the declination index values of the temperature sensors 22 to 24 is not lower than the threshold, it is possible to control the number of rotations of the cooling fans 12 to be lower as the declination index value is larger (as the degree of declination of the component temperature indicated by the declination index value is larger).

Effects of First Exemplary Embodiment

According to the present embodiment, it is possible to achieve an advantageous effect that even if the intake air temperature drops sharply, damage or malfunction of the electronic components can be prevented. This is because declination index values indicating the degree of declination of the component temperatures are calculated based on the detection results of the temperature sensors 22 to 24 which detect the component temperatures, and based on the calculated declination index values, the number of rotations of the cooling fans 12 is controlled. By performing such control of the number of rotations of the fans based on the declination index values, even if the intake air temperature drops sharply, a temperature difference between the internal air temperature inside the casing of the hard disk drive and the temperature of the inner wall of the casing, for example, does not become large. As such, it is possible to prevent generation of rust due to condensation, so that damage or malfunction of the hard disk drives can be prevented.

Second Exemplary Embodiments

Next, ICT equipment according to a second exemplary embodiment of the present invention will be described.

Figure 10:
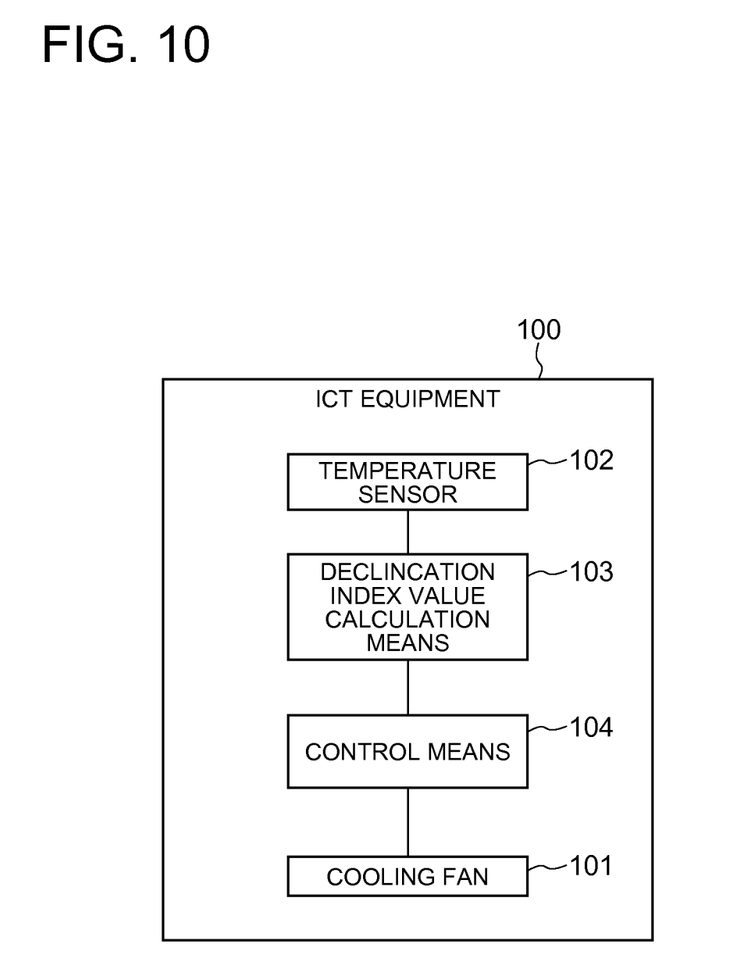
FIG. 10 is a block diagram showing an exemplary configuration of ICT equipment 100 according to a second exemplary embodiment of the present invention.

Referring to FIG. 10, ICT equipment 100 according to the present embodiment includes a cooling fan 101, a temperature sensor 102, a declination index value calculation means (unit) 103, and a control means (unit) 104.

The temperature sensor 102 detects component temperatures of the hard disk drive, the CPU, and the like installed in the ICT equipment 100.

The declination index value calculation means 103 calculates a declination index value indicating the degree of declination of each component temperature based on the detection result of the temperature sensor 102. As a declination index value, a quantity of declination of a component temperature per unit time, a difference between the highest component temperature in a past certain period of time and the current component temperature, or the like may be used.

The control means 104 controls the number of rotations of the cooling fan 101 according to the declination index value calculated by the declination index value calculation means 103. More specifically, the control means 104 controls the number of rotations of the fan to be lower as the degree of declination of the component temperature, indicated by the declination index value calculated by the declination index value calculation means 103, is larger.

It should be noted that the declination index value calculation means 103 and the control means 104 can be realized by the CPU. In that case, they are realized in the following manner. A disk, a semiconductor memory, or another recording medium storing a program for functioning the CPU as the declination index value calculation means 103 and the control means 104 is prepared, and the CPU is caused to read by the program. The CPU controls the own operation according to the readout program, and realizes the declination index value calculation means 103 and the control means 104 on the own CPU.

Effect of Second Exemplary Embodiment

According to the present embodiment, it is possible to achieve an advantageous effect that even if the intake air temperature drops sharply, damage or malfunction of the electronic components can be prevented. This is because declination index values indicating the degree of declination of the component temperatures of the ICT equipment are calculated based on the detection results of the temperature sensor 102 which detects the component temperatures, and based on the calculated declination index values, the number of rotations of the cooling fan 101 is controlled.

The invention claimed is:

1. ICT (information and Communication Technology) equipment having an electronic component, the ICT equipment comprising:
   a cooling fan;
   a first temperature sensor that detects a component temperature of the electronic component included in the ICT equipment;
   a second temperature sensor that detects a temperature of an intake air; and
   a microprocessor including:
   a declination index value calculation unit that calculates an index value indicating a degree of declination of the component temperature of the electronic component based on a detection result of the first temperature sensor; and
   a control unit that controls the number of rotations of the cooling fan based on the index value calculated by the declination index value calculation unit and the temperature of the intake air by the second temperature sensor.

2. The ICT equipment according to claim 1, wherein the index value is a declined temperature per unit time of the component temperature of the electronic component.

3. The ICT equipment according to claim 1, wherein the index value is an average value of declination rates of the component temperature of the electronic component in a plurality of measurement periods.

4. The ICT equipment according to claim 1, wherein the index value is a difference between a highest value of the component temperature of the electronic component in a past certain period and a current component temperature.

5. The ICT equipment according to claim 1, wherein the control unit controls the number of rotations of the cooling fan to be lower as the degree of declination of the component temperature of the electronic component, indicated by the index value calculated by the declination index value calculation unit, is larger.

6. The ICT equipment according to claim 1, wherein if the index value is not less than a predetermined threshold, the control unit stops the cooling fan.

7. A control device for ICT (Information and Communication technology) equipment having a cooling fan, electronic component, a first temperature sensor for detecting a temperature of the electronic component, and a second temperature sensor that detects a temperature of an intake air, the control device comprising:
   a microprocessor including:
   a declination index value calculation unit that calculates an index value indicating a degree of declination of a component temperature of the electronic component included in ICT equipment, based on a detection result of the first temperature sensor that detects the component temperature of the electronic component; and
   a control unit that controls the number of rotations of a cooling fan based on the index value calculated by the declination index value calculation unit and the temperature of the intake air by the second temperature sensor.

8. A temperature controlling method comprising:
   by a declination index value calculation unit, calculating an index value indicating a degree of declination of a component temperature of an electronic component included in ICT (Information and Communication Technology) equipment, based on a detection result of a first temperature sensor that detects the component temperature of the electronic component and a second temperature sensor that detects a temperature of an intake air; and
   by a control unit, controlling the number of rotations of a cooling fan based on the index value calculated by the declination index value calculation unit and the temperature of the intake air by the second temperature sensor.

* * * * *